United States Patent
Kaltenbrunner et al.

(10) Patent No.: US 6,873,061 B2
(45) Date of Patent: Mar. 29, 2005

(54) TRANSPONDER KEY FOR AN ELECTRONIC DRIVE-AWAY BLOCKING DEVICE FUNCTION

(75) Inventors: Martin Kaltenbrunner, Taufkirchen (DE); Harald Kemmann, Velbert (DE)

(73) Assignees: Bayerische Motoren Werke Aktiengesellschaft, Munich (DE); Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 10/437,461

(22) Filed: May 14, 2003

(65) Prior Publication Data

US 2004/0004399 A1 Jan. 8, 2004

Related U.S. Application Data

(63) Continuation of application No. PCT/EP01/12091, filed on Oct. 19, 2001.

(30) Foreign Application Priority Data

Nov. 15, 2000 (DE) .......................................... 100 56 573

(51) Int. Cl.[7] .............................................. B60R 25/00
(52) U.S. Cl. .................... 307/10.2; 307/10.3; 307/10.5; 340/425.5; 340/426.1; 180/271; 180/287
(58) Field of Search ............................... 307/10.2, 10.3, 307/10.5; 340/425.5, 426.1; 180/271, 287

(56) References Cited

U.S. PATENT DOCUMENTS

| | | | | |
|---|---|---|---|---|
| 5,554,977 A | * | 9/1996 | Jablonski et al. .......... 307/10.2 |
| 5,561,331 A | | 10/1996 | Suyama et al. ............ 307/10.3 |
| 5,841,364 A | * | 11/1998 | Hagl et al. ................. 340/10.4 |
| 6,037,858 A | * | 3/2000 | Seki .......................... 307/10.2 |
| 6,204,570 B1 | * | 3/2001 | Muller ....................... 307/10.2 |
| 6,263,197 B1 | * | 7/2001 | Shibagaki et al. ........ 455/186.1 |
| 6,317,025 B1 | * | 11/2001 | Leon et al. ................ 340/5.21 |
| 6,703,919 B2 | * | 3/2004 | Baset ........................ 307/10.2 |

FOREIGN PATENT DOCUMENTS

| | | |
|---|---|---|
| DE | 91 11 651.1 | 9/1991 |
| DE | 196 04 206 A1 | 2/1996 |
| DE | 196 07 017 A1 | 2/1996 |
| DE | 297 20 720 U1 | 11/1997 |
| DE | 298 23 731 U1 | 4/1998 |
| EP | 0 395 596 A3 | 4/1990 |
| EP | 0 690 189 A1 | 5/1995 |
| EP | 0 811 739 A3 | 7/1999 |
| WO | WO 00/15476 | 3/2000 |

\* cited by examiner

*Primary Examiner*—Robert L. Deberadinis
(74) *Attorney, Agent, or Firm*—Crowell & Moring LLP

(57) ABSTRACT

In a transponder key for an electronic drive-away blocking device function, which may have at least a first status in the form of the deactivation of the drive-away blocking device and a second status in the form of an activation of the drive-away blocking device, a first memory area is provided in which status information can be stored, indicating the most recently implemented status. Preferably, a second memory area is also provided in the transponder key in which a cycle counter information can be stored, indicating the reading of a counter that is incremented whenever a transition takes place from the second status to the first status.

4 Claims, 1 Drawing Sheet

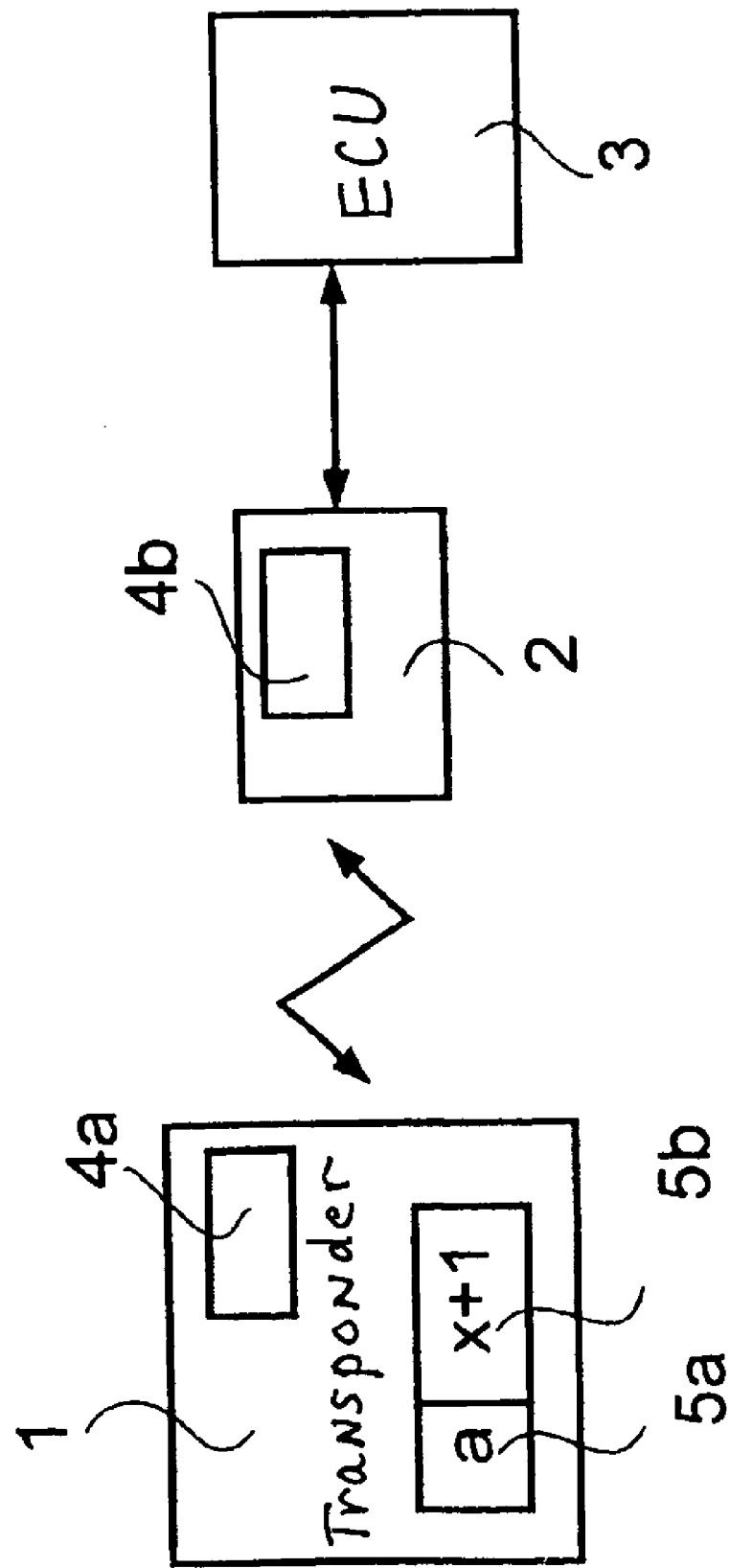

TRANSPONDER KEY FOR AN ELECTRONIC DRIVE-AWAY BLOCKING DEVICE FUNCTION

CROSS-REFERENCE TO RELATED APPLICATIONS

This application is a continuation of PCT Application No. PCT/EP01/12091 filed on 19 Oct. 2001 and published as WO 02/40325 A1 on May 23, 2002.

BACKGROUND AND SUMMARY OF THE INVENTION

This application claims the priority of German patent document 100 56 573.5, filed 15 Nov. 2000 (15.11.2000), the disclosure of which is expressly incorporated by reference herein.

The invention relates to a transponder key for an electronic drive-away blocking device.

Currently, such a transponder key is widely used in vehicles together with a drive-away blocking device, such as is required by insurance companies. A transponder key may, for example, be a mechanical key with an integrated electronic unit for the code transmission or a purely electronic code card. Normally, the drive-away blocking device, having been activated after the ignition is switched off, is deactivated before the vehicle is started, by a coded exchange between the transponder key and a control unit inside the motor vehicle, to check authorization for a vehicle start. Thus, a cycle of the drive-away blocking device function starts with the deactivation status and ends with the activation status.

In the event of a theft, all approved keys must be presented to the insurance company, so that a theft as a result of a negligent handling of the keys can be excluded with reasonable probability.

One object of the invention is to provide an improved electronic drive-away blocking device of the mentioned initially type.

Another object of the invention is to provide a system which facilitates proof that a theft occurred despite care exercised by the vehicle owner.

Particularly in the case of vehicles with an electronic access system (transponder key) (also called "passive access" when no mechanical key is required), it should be possible to prove a proper handling/locking.

These and other objects and advantages are achieved according to the invention, in which a first memory area is provided in a transponder key for an electronic drive-away blocking device function, which may have at least a first status in the form of a deactivation of the drive-away blocking device and a second status in the form of an activation of the drive-away blocking device. Status information which indicates the respective last status can be stored in the memory area. More than two possible statuses may also be provided.

It is important that a cycle of statuses is provided which starts with the first status and ends with the second status. In this manner, when a transponder key is presented to the insurance company, if the second status is present as the (last) status information, it can be proven that the drive-away blocking device had been properly activated before the theft.

A second memory area is preferably also provided in the transponder key, in which a cycle counter information can be stored. The latter indicates the reading of a counter which will be incremented whenever a transition took place from the second status to the first status; thus, when a new cycle is starting.

Since normally more than one transponder key is assigned to a vehicle, it is possible that the drive-away blocking device can be deactivated, for example, by means of a first key and activated by means of another key. In this case, it can be checked by means of the cycle counter information whether at least the transponder with the highest counter reading has stored the second status as the last status.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing illustrates the components of a drive-away blocking device function with the expansion of the transponder key according to one embodiment of the invention.

A transponder key 1 communicates, for example via radio transmission, with a drive-away blocking device control unit 2 on the inside of the motor vehicle. The drive-away blocking device control unit 2 is connected, for example, by way of a data bus with an engine control unit 3 for operating an internal-combustion engine. A code 4a is filed in the transponder key 1, and a code 4b is filed in the drive-away blocking device control unit 2.

In a representative embodiment of the invention, four statuses are defined:

a. first status: deactivation of the drive-away blocking device
b. second status: internal-combustion engine running
c. third status: internal-combustion engine stopped
d. fourth status: activation of the drive-way blocking device A cycle is: a-b-c-d.

The drive-away blocking device control unit 2 compares, for example, code 4a transmitted by the transponder key 1 with code 4b and deactivates the drive-away blocking device by a release signal to the engine control unit 3 when code 4a corresponds to code 4b (status information: a). Then the engine control unit 3 starts the operation of the internal-combustion engine. (Status information: b). After a drive, the ignition is switched off, for example, by the driver and the internal-combustion engine is stopped (status information: c). For example, after the withdrawal of the transponder key from the ignition lock (if provided), or after the removal of the transponder key 1 from the radio range, the driving-away blocking device is activated (status information: d). The cycle is terminated. During the next deactivation operation (status information: a), a counter is incremented. The cycle counter information X is therefore increased by one step X+1.

After a theft, at least the transponder key with the highest counter reading, when comparing the counter readings of all transponder keys approved for the vehicle (cycle counter information: $X_{max}$) has to contain d as the status information. In this manner, it can be proven that a theft occurred despite the proper activation of the drive-away blocking device, particularly in the case of passive-access vehicles.

The status information (a to d) and the cycle counter information (X, X+1 . . . ) can be formed either in the transponder key 1 itself or by the drive-away blocking device control unit 2. It is important that no later than after each activation of the drive-away blocking device, the two types of information are transmitted into the memory areas 5a (status information) and 5b (cycle counter information) of the transponder key 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transponder key for an electronic drive-away blocking device having at least an unblocked status in which the drive-away blocking function is deactivated and a blocked status in which the drive-away blocking device is activated, said transponder key comprising:

communication means for actuating said drive-away blocking device to transition between a blocked status and an unblocked status;

a first memory means for storing status information which indicates a status of said drive-away blocking device most recently actuated by said transponder key; and a second memory means for storing count information indicating a number of times said transponder key has actuated said drive-away blocking device to transition from said blocked status to said unblocked status.

2. The transponder key according to claim 1, wherein said count information is incremented upon the occurrence of one of withdrawal of said transponder key from a vehicle ignition lock and removal of said transponder key from a communication range of said communication means.

3. An electric drive-away blocking system, comprising:

an electronic drive-away blocking device having at least an unblocked status, in which a drive-away blocking function is deactivated, and a blocked status, in which the drive-away blocking function is activated; and a plurality of transponders, each of which is adapted to communicate with said electronic drive-away blocking device to actuate said drive-away blocking device to change its status; wherein each transponder comprises, a first memory means for storing status information indicating a status most recently actuated by said transponder; and a second memory means for storing count information indicating a number of times said transponder has actuated said drive-away blocking device to chance its status from said blocked status to said unblocked status.

4. A method of operating an electronic drive-away blocking system having an electronic drive-away blocking device that can be actuated by any one of a plurality of transponder keys, to enter either of an unblocked status in which a drive-away blocking function is deactivated, or a blocked status in which the drive-away blocking function is activated, said method comprising:

actuating a change of status of said drive-away blocking device by a signal from a particular transponder key; and storing in a first memory information indicative of a status most recently actuated in said drive-away blocking device via a signal from said particular transponder; and storing in a second memory count information indicating a number of times that a signal from said particular transponder has actuated said drive-away blocking device to enter said unblocked status.

* * * * *